Aug. 18, 1925.
C. C. FARMER
1,549,757
PIPE CONNECTION
Filed Aug. 28, 1923
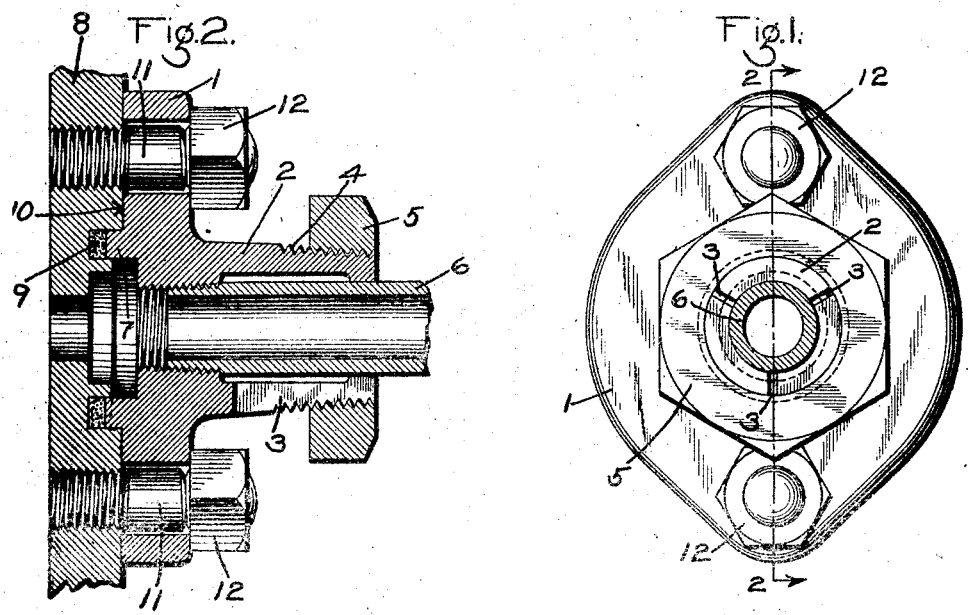
INVENTOR
CLYDE C. FARMER
BY *Wm. M. Bady*
ATTORNEY Patented Aug. 18, 1925.

1,549,757

UNITED STATES PATENT OFFICE.

CLYDE C. FARMER, OF PITTSBURGH, PENNSYLVANIA, ASSIGNOR TO THE WESTINGHOUSE AIR BRAKE COMPANY, OF WILMERDING, PENNSYLVANIA, A CORPORATION OF PENNSYLVANIA.

PIPE CONNECTION.

Application filed August 23, 1923. Serial No. 659,732.

*To all whom it may concern:*

Be it known that I, CLYDE C. FARMER, a citizen of the United States, residing at Pittsburgh, in the county of Allegheny and State of Pennsylvania, have invented new and useful Improvements in Pipe Connections, of which the following is a specification.

This invention relates to pipe connections and the principal object of my invention is to provide an improved pipe connection in which the pipe is supported independently of the screw-threaded pipe connection, so that the threaded portion of the pipe is protected against strain.

In the accompanying drawing; Fig. 1 is a face view of a pipe connection embodying my invention; and Fig. 2 a section on the line 2—2 of Fig. 1.

According to my invention, a flanged pipe supporting member is provided having a flange portion 1 and a sleeve portion 2. The sleeve portion 2 is slotted, as at the points 3 and the outer cylindrical face of the sleeve is provided with tapered screw-threads 4 for receiving a nut 5.

The sleeve 2 is centrally apertured and is tapped for pipe 6. At the rear and concentric with pipe 6 the flange portion 1 is provided with a seating ring 7 which projects into a recess formed in the member 8 to which the pipe 6 is to be connected, said ring being adapted to engage a gasket 9, so as to make a leak tight joint. The face 10 of flange portion 1 bears against the face of the member 8. Studs 11 are screwed into the member 8 and extend through apertures in the flange portion 1, so that the flange portion may be clamped to the member 8 by means of nuts 12 applied to said studs.

When the pipe 6 has been screwed into the sleeve portion 2, the clamping nut 5 is screwed up, so that the split portions of the sleeve 2 are forced into clamping engagement with the pipe 6 at a point remote from the screw-threaded connection of the pipe.

The pipe 6 is thus supported independently of the screw threads, thus relieving same of strain and preventing possible breakage of the pipe at the screw-threaded portion and possible leakage due to loosening of the pipe threads.

It will also be noted that while the flange portion 1 makes a solid metal to metal joint with the member 8, a leak tight connection is provided by the engagement of the ring 7 with the gasket 9.

Having now described my invention, what I claim as new and desire to secure by Letters Patent, is:—

The combination with a pipe, and a member with which said pipe communicates, of a device for supporting said pipe comprising a flange portion adapted to be secured to said member, a sleeve portion in which said pipe has screw-threaded connection, means for clamping said sleeve portion to the pipe, a seating ring associated with the flange portion, and a gasket mounted in a recess in said member and adapted to be engaged by said ring.

In testimony whereof I have hereunto set my hand.

CLYDE C. FARMER.